United States Patent [19]
Anderson et al.

[11] Patent Number: 5,819,516
[45] Date of Patent: Oct. 13, 1998

[54] OVER-THE-TOP SUPPORT ARM FOR PICKUP GAUGE WHEEL OF A BALER

[75] Inventors: J. Dale Anderson, Canton; La Vern Roy Goossen, Newton, both of Kans.

[73] Assignee: Hay & Forage Industries, Hesston, Kans.

[21] Appl. No.: 733,758

[22] Filed: Oct. 18, 1996

[51] Int. Cl.⁶ ..................................................... A01F 15/07
[52] U.S. Cl. ............................................. 56/341; 100/88
[58] Field of Search ............................ 56/341, 342, 343, 56/344; 100/88, 89

[56] References Cited

U.S. PATENT DOCUMENTS

| | | |
|---|---|---|
| 3,962,849 | 6/1976 | Stoessel et al. . |
| 4,198,804 | 4/1980 | Konekamp et al. ...................... 56/341 |
| 4,855,924 | 8/1989 | Strosser et al. ...................... 100/88 X |
| 4,945,719 | 8/1990 | Schrag et al. . |
| 5,136,831 | 8/1992 | Fell et al. . |

FOREIGN PATENT DOCUMENTS 8501538  12/1986  Netherlands ............................. 56/341

OTHER PUBLICATIONS

New Holland Sales Brochure No. 31063041–39540–API, "Roll–Belt Round Balers 630 640 650 660". pp. 1–24 (1995).

Primary Examiner—Terry Lee Melius
Attorney, Agent, or Firm—Hovey, Williams, Timmons & Collins

[57] ABSTRACT

A pickup header (18) has upwardly arched, inversely U-shaped gauge wheel support arms (24,25) that secure the gauge wheels (22,23) to opposite ends of the pickup header (18). Each gauge wheel support arm (24,25) includes a first depending leg member (50) attached to the outboard side (46) of its gauge wheel (22,23) and a support section (52) that is attached proximal to the end of the pickup header (18). Each gauge wheel support arm (24,25) extends over the top of its gauge wheel (22,23) and attaches to the outboard side (46) of the gauge wheel (22,23), thus eliminating any "pinch-zones" between the gauge wheels and the pickup header.

18 Claims, 2 Drawing Sheets

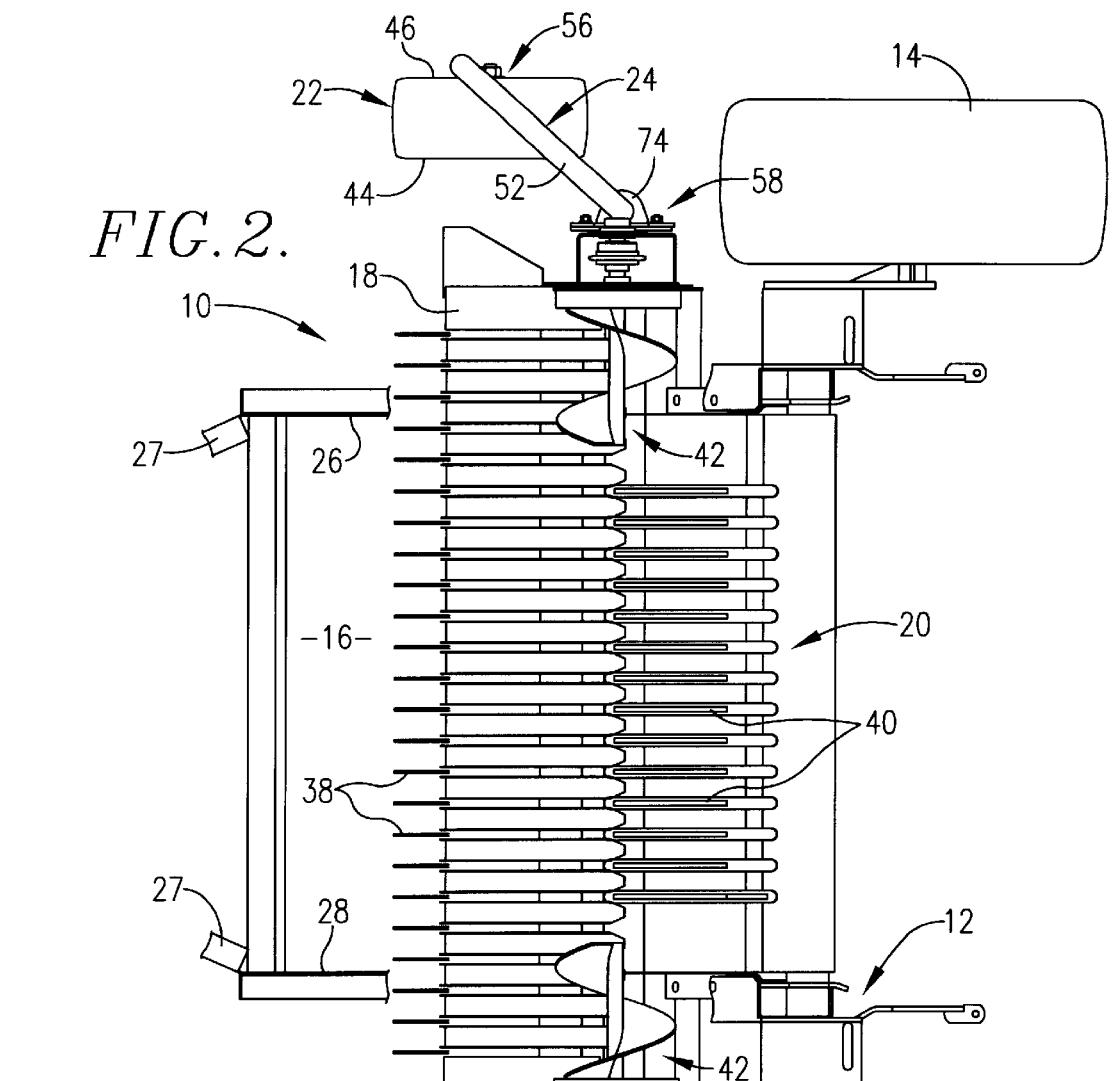
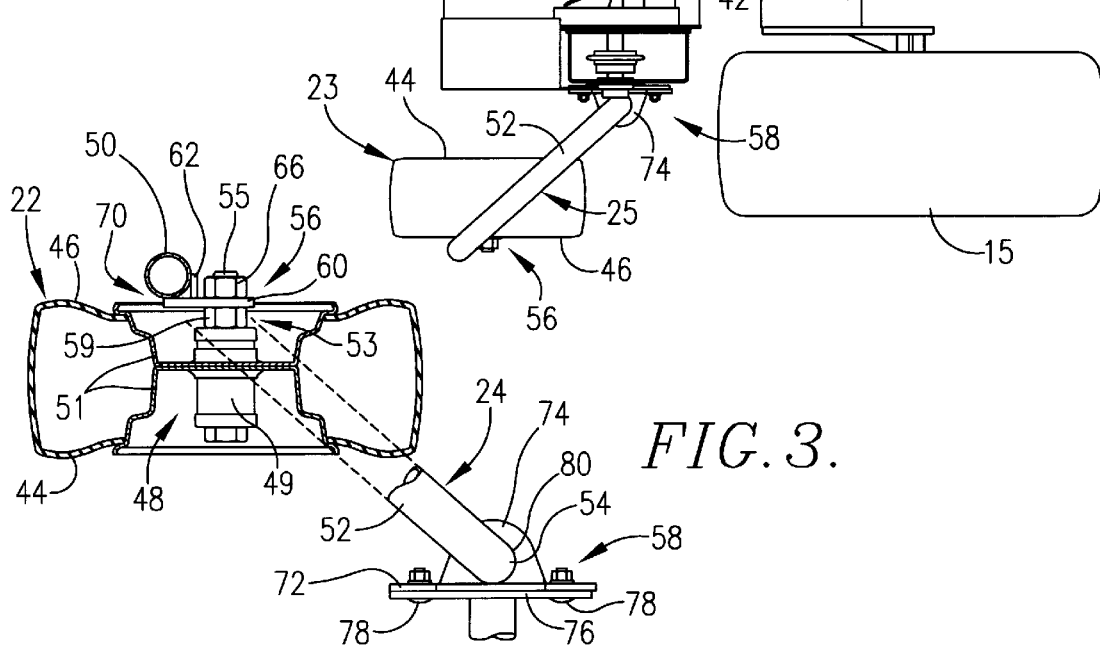

OVER-THE-TOP SUPPORT ARM FOR PICKUP GAUGE WHEEL OF A BALER

CROSS-REFERENCE TO RELATED APPLICATIONS

See also the following contemporaneously filed applications for U.S. Letters Patent: Ser. No. 08/731,768, entitled ROUND BALER HAVING TAILGATE-RESPONSIVE CLUTCH; Ser. No. 08/731,764, entitled DOWN TURNING STUB AUGERS ON WIDE PICK-UP FOR ROUND BALERS; Ser. No. 08/733,757, entitled TALL SLEEVES FOR ROUND BALER DRIVE ROLLS; Ser. No. 08/731,395, entitled EASED INLET TAILGATE ROLL ARRANGEMENT FOR VARIABLE CHAMBER ROUND BALER; and Ser. No. 08/731,767, entitled END OF ROUND BALE TWINE GUIDES.

BACKGROUND OF THE INVENTION

1. Field of the Invention

The present invention relates generally to balers, and more particularly to a gauge wheel support arm for mounting a gauge wheel to the pickup header of a baler. The gauge wheel support arm extends over the top of the gauge wheel and mounts to the outboard side of the gauge wheel rather than the inboard side of the gauge wheel. This construction leaves the area between the gauge wheel and the adjacent side of the pickup header open for preventing crop material from becoming clogged near the gauge wheel and for facilitating the collection of crop from the sides of the pickup header.

2. Discussion of Prior Art

When collecting crop with a baler, it is often desirable to use a wide-windrow pickup header for permitting the collection of crops from a wider windrow. Wide-windrow pickup headers are typically mounted to the front of the baler and are supported above the ground by a pair of gauge wheels.

In prior art balers having wide windrow pickup headers, the gauge wheels are supported on opposite ends of the pickup header by axle supports that extend between the pickup header and the inboard sides of the gauge wheels. This gauge wheel support arrangement reduces the effectiveness of prior art balers in several regards.

For example, since prior art gauge wheel axle supports extend across the area between the sides of the pickup header and the gauge wheels and support the gauge wheels by their inboard sides, the area between the sides of the pickup header and the gauge wheels becomes closed. This creates "pinch points" between the gauge wheels and the sides of the pickup header that often become clogged with crop, thus causing drag on the baler and reducing its maneuverability. Additionally, these prior art gauge wheel axle supports often become tangled in crop that is near the sides of the pickup header. This interferes with the collection of crop from the sides of the pickup header.

Another limitation of prior art gauge wheel axle supports is that they sometimes snag loose crop as the baler is driven across a windrow at the end of the field or during movement from one field to another. Those skilled in the art will appreciate that this significantly reduces the maneuverability of the balers and requires the operator of the baler to frequently remove the snagged material.

A further limitation of prior art gauge wheel axle supports is that they do not support their respective gauge wheels near the center line of the rotating tines of the pickup header. It is important to support the gauge wheels near the center line of the rotating tines because this allows the gauge wheels to follow the contours of the ground near the rotating tines. If the gauge wheels are not centered with the rotating tines, the gauge wheels do not accurately maintain the desired distance between the rotating tines and the ground.

Thus, a need exists for gauge wheel support structure for use in mounting the gauge wheels on a baler having a wide windrow pickup header that does not create "pinch points" between the gauge wheels and the sides of the pickup header, that does not interfere with the collection of crop from the sides of the pickup header, that does not hinder the maneuverability of the baler as it is pulled across a windrow, and that more accurately maintains the height between the pickup header and the ground at the point where the tines of the pickup header are collecting crop.

OBJECTS AND SUMMARY OF THE INVENTION

In view of the limitations of prior art balers, and particularly the limitations of prior art gauge wheel support structures for use with balers, it is an object of the present invention to provide a gauge wheel support arm for use with a baler having a wide windrow pickup header that does not close in the area between the gauge wheel and the sides of the pickup header, thus eliminating the "pinch points" found in prior art balers.

It is another object of the present invention to provide a gauge wheel support arm for use with a baler having a wide windrow pickup header that does not interfere with the collection of crop from opposite ends of the pickup header.

It is another object of the present invention to provide a gauge wheel support arm for use with a baler having a wide windrow pickup header that does not hinder the maneuverability of the baler as it is pulled across a windrow.

It is another object of the present invention to provide a gauge wheel support arm for use with a baler having a wide windrow pickup header that supports the gauge wheels at a point near the center line of the rotating tines of the pickup header to allow the gauge wheels to track the contours of the ground at a point near where the pickup header is collecting the crop from the ground.

It is a more specific object of the present invention to provide a gauge wheel support arm for use with a baler having a wide windrow pickup header that extends over the top of its supported gauge wheel and that mounts to the outboard side of the gauge wheel rather than the inboard side of the gauge wheel for opening up the area between the gauge wheels and the sides of the pickup header.

In accordance with these and other objects evident from the following description of a preferred embodiment of the invention, an improved gauge wheel support arm for use with a baler having a wide windrow pickup header is disclosed. More particularly, the present invention provides a gauge wheel support arm that does not create "pinch points" between the gauge wheels and the sides of the pickup header, that does not interfere with the collection of crop from the sides of the pickup header, that does not hinder the maneuverability of the baler as is collects crop from a windrow, and that more accurately maintains the height between the pickup header and the ground at the point where the tines of the pickup header are collecting crop.

The gauge wheel support arm of the present invention broadly includes a first depending leg member having its lower end attached to the gauge wheel and a support section that is coupled with the upper end of the depending leg member and that extends generally transversely from the depending leg member. The support member is then attached proximal to one end of the pickup header of the baler. In preferred forms, the first depending leg member is attached to the outboard side of the gauge wheel so that the gauge wheel support arm extends over the top of the gauge wheel.

Preferably, the gauge wheel support arm comprises a generally inverted U-shaped tubular body that includes a pair of spaced-apart first and second depending leg members, with the support section described above forming an interconnecting bight section between the first and second depending leg members. One of the first and second leg members is mounted to one end of the pickup header and the other of the first and second leg members is mounted to the outboard side of the gauge wheel so that the bight section extends over the top and straddles a portion of the gauge wheel. With this construction, the gauge wheel support arm mounts the gauge wheel to the baler at the outboard side of the gauge wheel rather than the inboard side.

In preferred forms, the gauge wheel support arms mount the gauge wheels at a point forward of the baler near the center line of the rotating tines of the pickup header. This allows the gauge wheels to more effectively and accurately maintain the height of the pickup header above the ground by tracking the contours of the ground at a point near where the pickup header is collecting the crop from the ground.

BRIEF DESCRIPTION OF THE DRAWING FIGURES

A preferred embodiment of the invention is described in detail below with reference to the attached drawing figures, wherein:

FIG. 2 is a partial top plan of the pickup header and stuffer assembly of the preferred baler;

FIG. 3 is an enlarged, fragmentary, top plan view of a gauge wheel and gauge wheel support arm mounted to the right side of the pickup header with the gauge wheel shown in partial section.

DETAILED DESCRIPTION OF A PREFERRED EMBODIMENT

Figure 1:
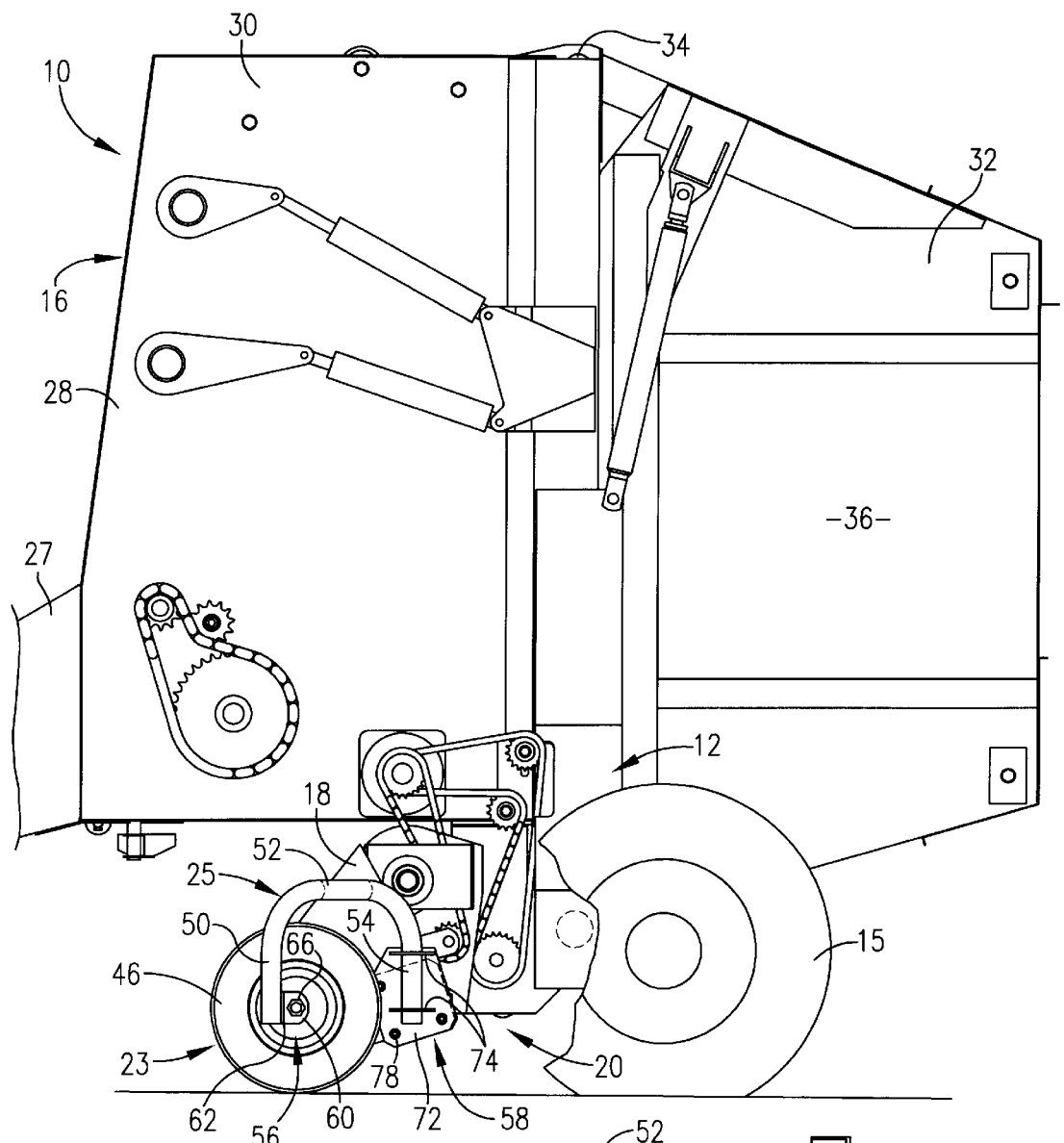
FIG. 1 is a partial side elevational view of a baler having a wide windrow pickup header constructed in accordance with a preferred embodiment of the present invention.

Referring to the drawing figures, and particularly FIGS. 1 and 2, a round baler 10 constructed in accordance with a preferred embodiment of the present invention is illustrated. For purposes of illustration and disclosure of a best mode of the invention, the baler is illustrated and described herein as a round baler. However, the present invention is equally applicable to square balers.

The round baler 10 broadly includes: a chassis 12 supported above the ground by a pair of ground wheels 14,15, a baling chamber 16 supported on the chassis 12 for forming bales therein; a pickup header 18 including a stuffer assembly 20 for collecting and delivering crop to the baling chamber 16; a pair of gauge wheels 22,23 for carrying and maintaining the height of the pickup header 18 above the ground; and a pair of gauge wheel support arms 24,25 for mounting the gauge wheels 22,23 to opposite ends of the pickup header 18. The round baler 10 may also include additional conventional baler components not discussed in detail herein such as a forwardly extending tongue 27 adapted for connection with a towing vehicle.

In more detail, the baling chamber 16 includes a pair of upright, laterally spaced sidewalls 26 and 28 (see FIG. 2) which cooperate to define a space within the baling chamber 16 for the forming and wrapping of bales as the round baler 10 is advanced across a field. Within the space defined by the sidewalls 26,28, the baler 10 includes bale forming mechanism (not shown) for compacting and rolling crop material into a round bale.

The sidewalls 26,28 present stationary forward portions 30 fixed to the chassis 12 by suitable means and rearward portions 32 swingably attached to the forward portions 30 by a pivot assembly 34. The rearward portions 32 of the sidewalls 26,28 cooperatively define a tailgate 36 which is swingable between an open, discharge position (not shown), in which the tailgate 36 has sufficiently raised to allow a completely formed bale to be discharged from the baler 10, and a closed, baling position (FIG. 1), in which bale wrapping and rolling operations are performed. The baling chamber 16 is open at the bottom to present a crop infeed entrance.

In one embodiment of the invention, the bale forming mechanism and sidewalls 26,28 cooperate to define a "variable chamber ", belt-type machine, wherein the baling chamber 16 is initially relatively small and then grows progressively larger as the bale increases in diameter within the baler 10. One example of a variable chamber type bale forming mechanism is described in U.S. Pat. No. 5,228,280, hereby incorporated by reference.

It will be appreciated, however, that the principles of the present invention are also applicable to a "fixed chamber" machine in which the dimensions of the baling chamber 16 are at least substantially constant throughout the baling cycle, with the diameter of the chamber 16 corresponding substantially with the diameter of the full size bale when completed.

The pickup header 18 is supported generally below and forward of the crop infeed entrance of the baler 10 for collecting, lifting, and delivering crop material from the field to the baling chamber 16 as the baler 10 is advanced along a windrow. As best illustrated in FIG. 2, the pickup header 18 is wider than the baling chamber 16 for permitting crop to be collected from a wider windrow.

The pickup header 18 generally includes a plurality of spaced-apart tines 38 extending across substantially the entire width of the pickup header 18. The tines 38 are moved in a generally elliptical path by conventional mechanism for collecting, lifting, and delivering crop to the stuffer assembly 20. The stuffer assembly 20 generally includes a plurality of spaced-apart stuffer fingers 40 that rotate and push the crop collected by the pickup header 18 into the baling chamber 16.

The pickup header 18 may also include a pair of downturning stub augers 42 rotatably mounted at opposite ends of the pickup header 18. The stub augers 42 move the crop collected by the outermost tines 38 of the pickup header 18 towards the center of the pickup header 18. This insures that all of the crop collected by the pickup header 18 is directed towards the narrower stuffer assembly 20 and the crop infeed region of the baling chamber 16. Such stub augers 42 are the subject of a co-pending U.S. patent application, Ser. No.08/731,764, filed Oct. 18, 1996, in the names of Howard J. Ratzlaff and J. Dale Anderson, entitled "DOWN TURNING STUB AUGERS ON WIDE PICK-UP FOR ROUND BALERS".

The gauge wheels 22,23 are identical and are mounted on opposite ends of the pickup header 18 for carrying and maintaining the height of the pickup header 18 above the ground. Each gauge wheel 22,23 presents an inboard side 44 which faces its respective end of the pickup header 18 and an outboard side 46 which faces away from its respective end of the pickup header 18.

Figure 4:
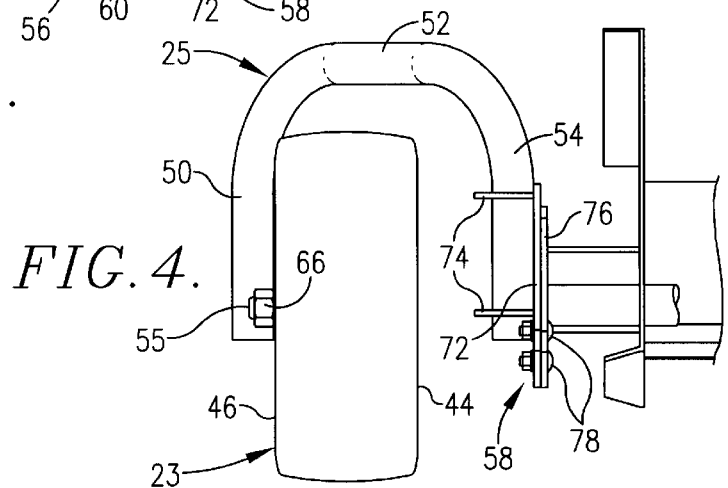
FIG. 4 is an enlarged fragmentary rear elevational view of a gauge wheel and gauge wheel support arm mounted to the left side of the pickup header.

The right gauge wheel 22 is illustrated in detail in FIG. 3, and the left gauge wheel 23 is illustrated in detail in FIG. 4. Referring to FIG. 3, each gauge wheel 22,23 includes a central axle assembly 48. The axle assembly 48 includes an outer tube 49 or race that is secured to adjoining wheel sections 51 of the gauge wheel 22 for rotation therewith and an inner race 53 preferably formed from a spindle bolt assembly that remains stationary relative to the outer tube 49 and gauge wheel 22. Conventional journal or roller bearing assemblies are disposed between the outer tube 49 and the spindle bolt assembly 53 for permitting rotation of the outer tube 49.

The spindle bolt assembly 53 presents a threaded end 55 that extends a distance from the outboard side of the gauge wheel 22. A jam nut 66 is threaded over the threaded end 55 for securing the gauge wheel support arm 24 to the outboard side of the gauge wheel 22 as described in more detail below. The preferred axle assembly 48 also includes a spacer or nut 59 disposed between the outer tube 49 and the jam nut 66 for spacing the gauge wheel support arm 24 a desired distance from the outboard side of the gauge wheel 22.

The gauge wheel support arms 24,25 mount the gauge wheels 22,23 to opposite ends of the pickup header 18. The gauge wheel support arm 24 mounted to the right gauge wheel 22 is illustrated in detail in FIG. 3, and the gauge wheel support arm 25 mounted to the left gauge wheel 23 is illustrated in detail in FIG. 4. When mounted between their respective gauge wheels 22,23 and the ends of the pickup header 18, the gauge wheel support arms 24,25 are mirror images of one another; therefore, features common to both are identified by the same reference numerals in the drawing figures.

Referring to FIGS. 3 and 4, each gauge wheel support arm 24,25 broadly includes a first depending leg member 50 having its lower end attached to its respective gauge wheel 22,23 and a support section 52 coupled with and extending generally transversely from the upper end of the depending leg section 50 and attached proximal to the pickup header 18. As illustrated, in preferred forms the first depending leg member 50 is attached to the outboard side 46 of its gauge wheel 22,23.

The preferred gauge wheel support arms 24,25 each include a pair of first and second spaced-apart depending leg members 50 and 54, with the support section 52 comprising an interconnecting bight section. The first and second spaced-apart depending leg members 50,54 are substantially identical and are adapted for attachment to either the outboard side 46 of one of the gauge wheels 22,23 or to one end of the pickup header 18. For clarity, each first depending leg member 50 is described herein as being attached to the outboard side 46 of its gauge wheel 22,23 and each second depending leg member 54 is described as being attached to one end of the pickup header 18.

The length of the first and second depending leg members 50,54, the width of the distance between the depending leg members 50,54 (i.e., the length of the interconnecting bight section), and the outside diameter of the tubular body may be of various sizes for permitting the gauge wheel support arms 24,25 to support gauge wheels 22,23 and pickup headers 18 of various sizes and weights.

The gauge wheel support arms 24,25 are mounted between their respective gauge wheels 22,23 and the pickup header 18 by mounting structure best illustrated in FIG. 3. When attached to their respective support arms, 24,25 and gauge wheels 22,23, the mounting structures are mirror images of one another; therefore, they are identified by the same reference numerals in the drawings.

Referring to FIG. 3, each mounting structure broadly includes a gauge wheel mounting plate 56 for attaching the first depending leg member 50 of its gauge wheel support arm 24,25 to the outboard side 46 of its gauge wheel 22,23 and a pickup header mounting plate 58 for attaching the second depending leg member 54 of its gauge wheel support arm 24,25 to one end of the pickup header 18. As discussed above, since the first and second depending leg members 50,54 are identical, either can be mounted to the gauge wheel mounting plate 56 and pickup header mounting plate 58.

In more detail, the gauge wheel mounting plate 56 includes a planar face portion 60 and an ear section 62 projecting transversely outwardly from the planar face portion 60 (FIG. 3). The planar face portion 60 is preferably formed of steel and is attached to the outboard side 46 of the gauge wheel 22,23 between the jam nut 66 and spacer 59 of the axle assembly 48.

The ear section 62 is preferably integrally formed with the planar face portion 60 or welded thereto. The planar face portion 60 and ear section 62 form a generally L-shaped corner 70 for receiving the depending leg members 50 of its gauge wheel support arm 24,25 (FIG. 3). The first depending leg member 50 is preferably welded or otherwise attached to this L-shaped corner 70.

As best illustrated in FIG. 4, the pickup header mounting plate 58 includes a planar face portion 72 and a pair of vertically aligned, spaced-apart and horizontally extending flanges 74 projecting outwardly from the planar face portion 72. The planar face portion 72 is generally rectangular in shape and is preferably formed of steel. The planar face portion 72 is attached to a corresponding pickup header support plate 76 by bolts 78 or other conventional attachment means. The pickup header support plate 76 is also generally rectangular in shape and formed of steel and is welded or otherwise attached to one end of the pickup header 18.

Each flange 74 of the pickup header mounting plate 58 includes a vertically opening central aperture 80 (FIG. 3). The apertures 80 of the two flanges 74 are in vertical alignment with one another. Referring to FIG. 4, the second depending leg member 54 of each gauge wheel support arm 24,25 is positioned through the apertures 80 and is welded to the flanges 74.

As best illustrated in FIG. 2, when coupled between the gauge wheels 22,23 and the ends of the pickup header 18, each gauge wheel support arm 24,25 extends over the top of its gauge wheel 22,23 and is attached to the outboard side 46 of its gauge wheel 22,23 rather than the inboard side 44. This opens the area between the gauge wheels 22,23 and the sides of the pickup header 18 so that crop can be more effectively pulled in from the sides of the header 18. Additionally, this construction reduces or eliminates the tendency of the gauge wheel support arms 24,25 from snagging crop in the windrows.

As best illustrated in FIG. 2, the gauge wheel support arms 24,25 preferably mount the gauge wheels 22,23 forward of the baling chamber 16 at a point near the center line of the rotating tines 38 of the pickup header 18. This allows the gauge wheels 22,23 to track the contours of the ground at a point near where the pickup header 18 is collecting the crop from the ground.

The foregoing description of a preferred form of the invention is to be used for purposes of illustration only, and should not be utilized in a limiting sense in interpreting the scope of the present invention. Obvious modifications to the exemplary embodiments, as hereinabove set forth, could be readily made by those skilled in the art without departing from the spirit of the present invention. For example, although the invention is described as being particularly useful in round balers having wide windrow pickup headers, the invention is equally applicable to square balers and balers having other types of pickup headers utilizing gauge wheels.

The inventors hereby state their intent to rely on the doctrine of equivalents to determine and assess the reasonably fair scope of their invention as pertains to any apparatus not materially departing from but outside the literal scope of the invention as set out in the following claims.

Having thus described the preferred embodiments of the invention, what is claimed as new and desired to be covered by Letters Patent includes the following:

1. In a baler having a baling chamber for forming bales therein and a pickup header for collecting and delivering crop to said baling chamber, the improvement comprising;
   at least one gauge wheel for carrying and maintaining the height of said pickup header above the ground, said gauge wheel presenting an inboard side facing toward said pickup header and an outboard side facing away from said pickup header; and
   a gauge wheel support arm mounting said gauge wheel to said pickup header, said gauge wheel support arm including;
      a first depending leg member attached to said gauge wheel and disposed on said outboard side of said gauge wheel so that said gauge wheel support arm extends over the top of said gauge wheel,
      a second depending leg member spaced-apart from and extending parallel to said first depending leg member, said second depending leg member being attached to said pickup header, and
      a support section coupled with an upper end of said first depending leg member and extending generally transversely from said first depending leg member, said support section comprising a bight section interconnecting said first and second leg members; and
   mounting structure securing said gauge wheel support arm between said outboard side of said gauge wheel and said pickup header for mounting said gauge wheel to said pickup header,
   said mounting structure including a gauge wheel mounting plate mounting said first depending leg member to said outboard side of said gauge wheel and a pickup header mounting plate mounting said second depending leg member to said pickup header.

2. In a baler as claimed in claim 1, said gauge wheel mounting plate including a planar face portion attached to said outboard side of said gauge wheel and an ear section projecting transversely outwardly from said planar section and coupled with said first depending leg member.

3. In a baler as claimed in claim 1, said pickup header mounting plate including a planar face portion attached to said pickup header and a pair of vertically aligned and spaced-apart flanges projecting transversely outwardly from said planar face portion, said flanges each presenting an aperture, said second depending leg member being received within said apertures and attached to said flanges.

4. An improved pickup header for use with a baler, said pickup header comprising:
   a frame;
   a plurality of movable crop-collecting members mounted within said frame for collecting crop for delivery to the baler;
   at least one gauge wheel for carrying and maintaining the height of said frame above the ground, said gauge wheel presenting an inboard side facing toward said frame and an outboard side facing away from said frame; and
   a gauze wheel support arm mounting said gauge wheel to said frame, said gauge wheel support arm including;
      a first depending leg member attached to said gauge wheel and is disposed on said outboard side of said gauge wheel so that said gauge wheel support arm extends over the top of said gauge wheel,
      a second depending leg member spaced-apart from and extending parallel to said first depending leg member, said second depending leg member being attached to said pickup header, and
      a support section coupled with the upper end of said first depending leg member and extending generally transversely from said first depending leg member, said support section comprising a bight section interconnecting said first and second leg members; and
   mounting structure securing said gauge wheel support arm between said outboard side of said gauge wheel and said pickup header for mounting said gauge wheel to said pickup header,
   said mounting structure including a gauge wheel mounting plate mounting said first depending leg member to said outboard side of said gauge wheel and a pickup header mounting plate mounting said second depending leg member to said pickup header.

5. The pickup header as claimed in claim 4, said gauge wheel mounting plate including a planar face portion attached to said outboard side of said gauge wheel and an ear section projecting transversely outwardly from said planar section and coupled with said first depending leg member.

6. The pickup header as claimed in claim 4, said pickup header mounting plate including a planar face portion attached to said pickup header and a pair of vertically aligned and spaced-apart flanges projecting transversely outwardly from said planar face portion, said flanges each presenting an aperture, said second depending leg member being received within said apertures and attached to said flanges.

7. In a baler having a baling chamber for forming bales therein and a pickup header for collecting and delivering crop to said baling chamber, the improvement comprising;
   at least one gauge wheel for carrying and maintaining the height of said pickup header above the ground, said gauge wheel presenting an inboard side facing toward said pickup header and an outboard side facing away from said pickup header; and
   a gauge wheel support arm mounting said gauge wheel to said pickup header, said gauge wheel support arm being attached to said gauge wheel at a first location and to said pickup header at a second location, with said first and second locations being substantially vertically aligned,
   said gauge wheel being spaced from said pickup header to define an open area between the inboard side of said gauge wheel and said pickup header, said support arm being located substantially outside said open area.

8. In a baler as claimed in claim 7, said gauge wheel support arm being tubular.

9. In a baler as claimed in claim 7, including a pair of gauge wheels and a pair of gauge wheel support arms mounting said gauge wheels to opposite ends of said pickup header.

10. In a baler as claimed in claim 7, said support arm including a first depending leg member attached to said outboard side of said gauge wheel and a support section coupled with an upper end of said depending leg member and extending generally transversely from said depending leg member and over the gauge wheel.

11. In a baler as claimed in claim 10, said gauge wheel support arm further including a second depending leg member spaced-apart from and extending parallel to said first depending leg member, said second depending leg member being attached to said pickup header, said support section comprising a bight section interconnecting said first and second leg members.

12. In a baler as claimed in claim 7, further including mounting structure securing said gauge wheel support arm between said outboard side of said gauge wheel and said pickup header for mounting said gauge wheel to said pickup header.

13. An improved pickup header for use with a baler, said pickup header comprising:

a frame;

a plurality of movable crop-collecting members mounted within said frame for collecting crop for delivery to the baler;

at least one gauge wheel for carrying and maintaining the height of said frame above the ground, said gauge wheel presenting an inboard side facing toward said frame and an outboard side facing away from said frame; and a gauge wheel support arm mounting said gauge wheel to said frame, said gauge wheel support arm being attached to said gauge wheel at a first location and to said frame at a second location, with said first and second locations being substantially vertically aligned, said gauge wheel being spaced from said frame to define an open area between the inboard side of said gauge wheel and said frame, said support arm being located substantially outside said open area.

14. The pickup header as claimed in claim 13, said gauge wheel support arm being tubular.

15. The pickup header as claimed in claim 13, including a pair of gauge wheels and a pair of gauge wheel support arms mounting said gauge wheels to opposite ends of said pickup header.

16. The pickup header as claimed in claim 13, said support arm including a first depending leg member attached to said outboard side of said gauge wheel and a support section coupled with an upper end of said depending leg member and extending generally transversely from said depending leg member and over the gauge wheel.

17. The pickup header as claimed in claim 16, said gauge wheel support arm further including a second depending leg member spaced-apart from and extending parallel to said first depending leg member, said second depending leg member being attached to said pickup header, said support section comprising a bight section interconnecting said first and second leg members.

18. The pickup header as claimed in claim 17, further including mounting structure securing said gauge wheel support arm between said outboard side of said gauge wheel and said pickup header for mounting said gauge wheel to said pickup header.

* * * * *